United States Patent

Sakai et al.

[11] Patent Number: 5,917,611
[45] Date of Patent: Jun. 29, 1999

[54] FACSIMILE MACHINE WITH COMBINED TRANSMISSION DATA AND TRANSMITTED IMAGE DATA DIVIDED FOR PRINTING ACCORDING TO PRINT SHEET SIZE EXCEPT FINAL PAGE

[75] Inventors: Hiroshi Sakai; Tetsuya Nishino; Yukihiro Oi; Yoshio Shirai; Masahiro Inoue; Masaru Sato; Yoshio Morita; Shigeaki Nakamura, all of Osaka, Japan

[73] Assignee: Mita Industrial Co., Ltd., Osaka-fu, Japan

[21] Appl. No.: 08/788,946

[22] Filed: Jan. 23, 1997

[30] Foreign Application Priority Data

Feb. 1, 1996 [JP] Japan ........................ 8-16917

[51] Int. Cl.⁶ .............. H04N 1/00; H04N 1/21; H04N 1/23; H04N 1/327
[52] U.S. Cl. .............. 358/400; 358/444; 358/449; 358/450; 358/468; 358/296
[58] Field of Search ................ 358/449, 450, 358/468, 496, 444, 296, 400

[56] References Cited

U.S. PATENT DOCUMENTS

| | | | |
|---|---|---|---|
| 4,398,222 | 8/1983 | Ogawa | 358/438 |
| 4,823,193 | 4/1989 | Takahashi | 358/434 |
| 4,924,324 | 5/1990 | Takaoka | 358/468 |
| 5,724,157 | 3/1998 | Otani et al. | 358/468 |

*Primary Examiner*—Scott Rogers
*Attorney, Agent, or Firm*—Jordan and Hamburg

[57] ABSTRACT

A facsimile machine with a plurality of cassettes which is capable of printing a transmission report including first data and second data on a printing sheet accommodated in the cassette where the first data being a result of the transmission and the second data being an image data of a transmitted data, said facsimile machine includes: a memory unit for storing the first data and the second data therein to be read out; an editing unit for reading out the first data and the second data from the memory unit and formulating a resultant data; a sheet size set unit for detecting and setting a size of printing sheet on which the resultant data is to be printed; a divider unit for dividing the resultant data into a plurality of block data according to the size set by the sheet size set unit; a judgment unit for judging whether the block data corresponding to the last page of report is solely the second data; and a print control unit for inhibiting printing of the second data on the last page of report when it is judged that the block data corresponding to the last page of report is solely the second data by the judgment unit.

7 Claims, 6 Drawing Sheets

FIG. 5

IMAGE DATA

MONITOR REPORT
COMMON DATA TRANSMISSION
DATA TRANSMITTED IN GOOD STATE

INFORMATION ON RESULT OF
DATA TRANSMISSION

| NO. | DATE | | ADDRESS | TIME | PAGE | RESULT | MODE |
|---|---|---|---|---|---|---|---|
| 021 | JAN.23 | 18:11 | 5549 | 0' 00' 49" | 001 | OK | N ECM |
| | | 18:13 | 5550 | 0' 00' 49" | 001 | OK | N ECM |
| | | 18:15 | 5551 | 0' 00' 49" | 001 | OK | N ECM |
| | | 18:17 | 5552 | 0' 00' 48" | 001 | OK | N ECM |
| | | 18:18 | 5553 | 0' 00' 49" | 001 | OK | N ECM |
| | | 18:19 | 5554 | 0' 00' 48" | 001 | OK | N ECM |
| | | 18:20 | 5555 | 0' 00' 49" | 001 | OK | N ECM |
| | | 18:22 | 5556 | 0' 00' 49" | 001 | OK | N ECM |
| | | 18:23 | 5557 | 0' 00' 49" | 001 | OK | N ECM |

FACSIMILE MACHINE WITH COMBINED TRANSMISSION DATA AND TRANSMITTED IMAGE DATA DIVIDED FOR PRINTING ACCORDING TO PRINT SHEET SIZE EXCEPT FINAL PAGE

BACKGROUND OF THE INVENTION

This invention relates to an improvement of facsimile machine with a function of printing a report on a result of data transmission upon completion of the data transmission via facsimile (hereinafter referred to as monitor report).

Conventionally, there have been known facsimile machines with a function of printing a monitor report. FIG. 5 shows an example of monitor report outputted from the facsimile machine, in which a lead portion of transmitted image data (usually a cover page of the transmitted image data or a lead end portion of the cover page) additionally follows information advising a user of a result on data transmission (e.g., completion or failure of data transmission). The lead portion of transmitted image data is added for the user to verify or identify the contents of transmitted data.

In facsimile machines, usually, such report is prepared according to A4 size format (standard size) and printed on A4-sized printing sheet(s) whose longer side is in parallel with the sheet transport direction in such a manner that a lead portion of the transmitted image data follows the information.

In the case where data of the monitor report is small enough to be printed on at least one sheet of A4 size, the monitor report is printed in one sheet in such a way that the transmitted image data follows the information on a result of data transmission.

On the contrary, in the case where data of the monitor report has to consume more than one sheet, e.g., common data was transmitted to various facsimile addresses sequentially (hereinafter referred to as "common data transmission"), the data on monitor report is divided into a plurality of block data corresponding to the longer side of A4-sized printing sheet, and printed on a specified number of A4-sized printing sheets to output a monitor report consisting of the specified number of pages, as shown in FIG. 5.

In such case, there may occur the case that the last page of monitor report contains the transmitted image data only. It is not necessarily required for the facsimile machine to output the last page containing the transmitted image data alone, as far as the user can identify the state of data transmission following the preceding page(s) showing the information on data transmission.

If the facsimile machine is capable of inhibiting printing out of the last page of report containing the transmitted image data alone in the above case, it would reduce consumption of printing sheets and shorten an overall operation time for the facsimile machine.

Further, in the conventional facsimile machines, when the facsimile machine runs short of A4-size printing sheets, the facsimile machines are capable of printing data concerning the report on printing sheets of the size other than A4 size, e.g., B5 size (see FIG. 6), B4 size as long as printing sheets of these sizes are set such that one side thereof is greater than the shorter side of A4-sized printing sheets.

In the above case (shortage of A4-sized printing sheets), the data on the report is also divided into a plurality of block data corresponding to the side of the set printing sheet which is in parallel with the sheet transport direction, and these block data are output on a specified number of the set printing sheets other than A4-sized printing sheets, page after page, thereby obtaining the monitor report consisting of the number of pages.

In this case, there also is the possibility that the last page of monitor report prints the transmitted image data alone. In similar to the former case (output of monitor report concerning common data transmission on A4-sized printing sheets), if the facsimile machine is capable of inhibiting printing out of the last page of report containing the transmitted image data alone, it would reduce consumption of printing sheets and shorten an overall operation time for the facsimile machine.

SUMMARY OF THE INVENTION

In view of the above, it is an object of the invention to provide a facsimile machine capable of reducing consumption of printing sheets by inhibiting printing of the last page of monitor report, if the last page contains transmitted image data alone.

It is another object of the invention to provide a facsimile machine capable of shortening an operation time for facsimile machine by the time required for printing the last page of monitor report by inhibiting printing of the last page of monitor report, if the last page contains transmitted image data alone.

To accomplish the above objects, the present invention is directed to a facsimile machine with a plurality of cassettes, capable of printing a transmission report including first data and second data on a printing sheet accommodated in the cassette where the first data being a result of the transmission and the second data being an image data of a transmitted data, comprises (a) a memory unit for storing the first data and the second data therein to be read out; (b) an editing unit for reading out the first data and the second data from the memory unit and formulating a resultant data in a unit of predetermined size for the transmission report; (c) a sheet size set unit for detecting and setting a size of printing sheet on which the resultant data is to be printed; (d) a divider unit for dividing the resultant data into a plurality of block data according to the size set by the sheet size set unit; (e) a judgment unit for judging whether the block data corresponding to the last page of report is solely the second data; and (f) a print control unit for inhibiting printing of the second data on the last page of report when it is judged that the block data corresponding to the last page of report is solely the second data by the judgment unit.

The size set by the sheet size set unit is preferably the same as the size of the predetermined size.

With the above arrangement, the editing unit edits the read out first and second data in such a manner that the second data follows the first data to form a resultant data for the report, and the divider unit divides the resultant data into a plurality of block data based on one side of the printing sheet of the size set by the printing sheet size set unit. The print control unit controllably inhibits a print of the second data on the last page of the transmission report when it is judged that the block data corresponding to the last page of report is solely the second data by the judgment unit.

In one aspect of the invention, the sheet size set unit includes a sensor for detecting the size of printing sheets accommodated in the cassette and the sheet size set unit sets a printing sheet accommodated in the other cassette whose size is smaller than the predetermined size when the sensor detects the absence of printing sheets of the predetermined size in the one cassette.

In another aspect of the invention, when the sensor detects the absence of printing sheets of the predetermined size, the size of printing sheets set by the printing sheet size set unit is set such that the longer side thereof is in parallel with the widthwise direction of the main body and greater than the width of the printing sheet of the predetermined size.

In still another aspect of this invention, the printing sheet size set unit allows a selection of a printing sheet accommodated in the other cassette regardless of a detection result on the presence or absence of printing sheets of the predetermined size in the one cassette.

Yet another aspect of this invention, the facsimile machine further comprises a report output instruction unit for selectively instructing if the transmission report is to be outputted and inhibiting printing of the transmission report.

With the facsimile machine thus constructed, the size of printing sheet on which the report is to be printed is not limited to the predetermined size, but any size of printing sheet can be effectively used as far as the printing sheet has one side greater than the shorter side of the printing sheet of the predetermined size. In particular, the present invention is especially useful in the following case. In case that the printing size set unit sets the size of printing sheet (e.g., B5 size) and B5 size printing sheets are placed such that a longer side thereof extends orthogonal to the sheet running direction, the B5 size printing sheet has a side parallel to the sheet running direction which is smaller than one side of printing sheet of the predetermined size (e.g., A4 size) in the sheet running direction. As a result, the report printed on B5-sized printing sheets takes a larger number of pages than the report printed on A4-sized printing sheets as illustrated in FIG. 6. In such case in particular, since the facsimile machine of the present invention can prohibit a print out operation of the last page if it is judged that the last page contains only the transmitted image data and the operator desires to do so, it shortens the operation time for the facsimile machine and saves consumption of printing sheets.

The above and other objects, features and advantages of the present invention will become more apparent upon a reading of the following detailed description and drawings.

BRIEF DESCRIPTION OF THE DRAWINGS

FIG. 5 is a diagram showing an example of monitor report concerning common data transmission.

DETAILED DESCRIPTION OF THE PREFERRED EMBODIMENTS OF THE INVENTION

Figure 1:
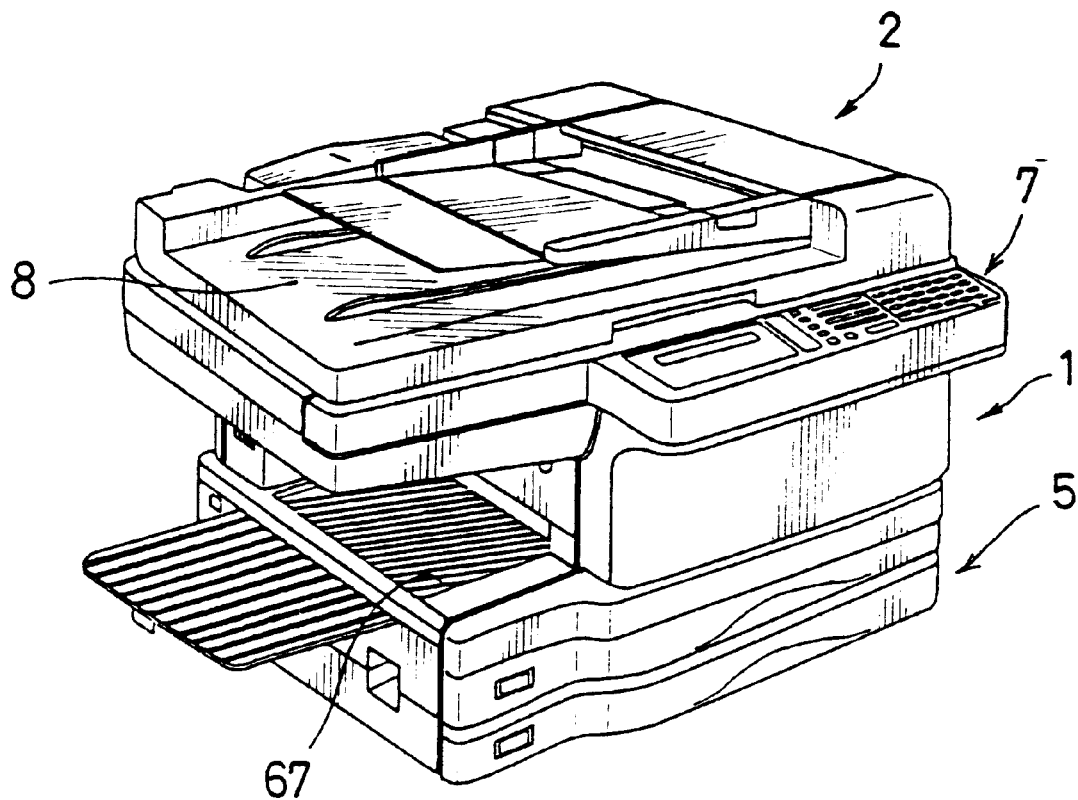
FIG. 1 is a perspective external view showing an embodiment of a facsimile machine according to the present invention.

An embodiment of the present invention is described with reference to the accompanying drawings. FIG. 1 is a perspective view of a facsimile machine embodying the present invention, and FIG. 2 is a diagram showing an internal arrangement of the facsimile machine.

Figure 2:
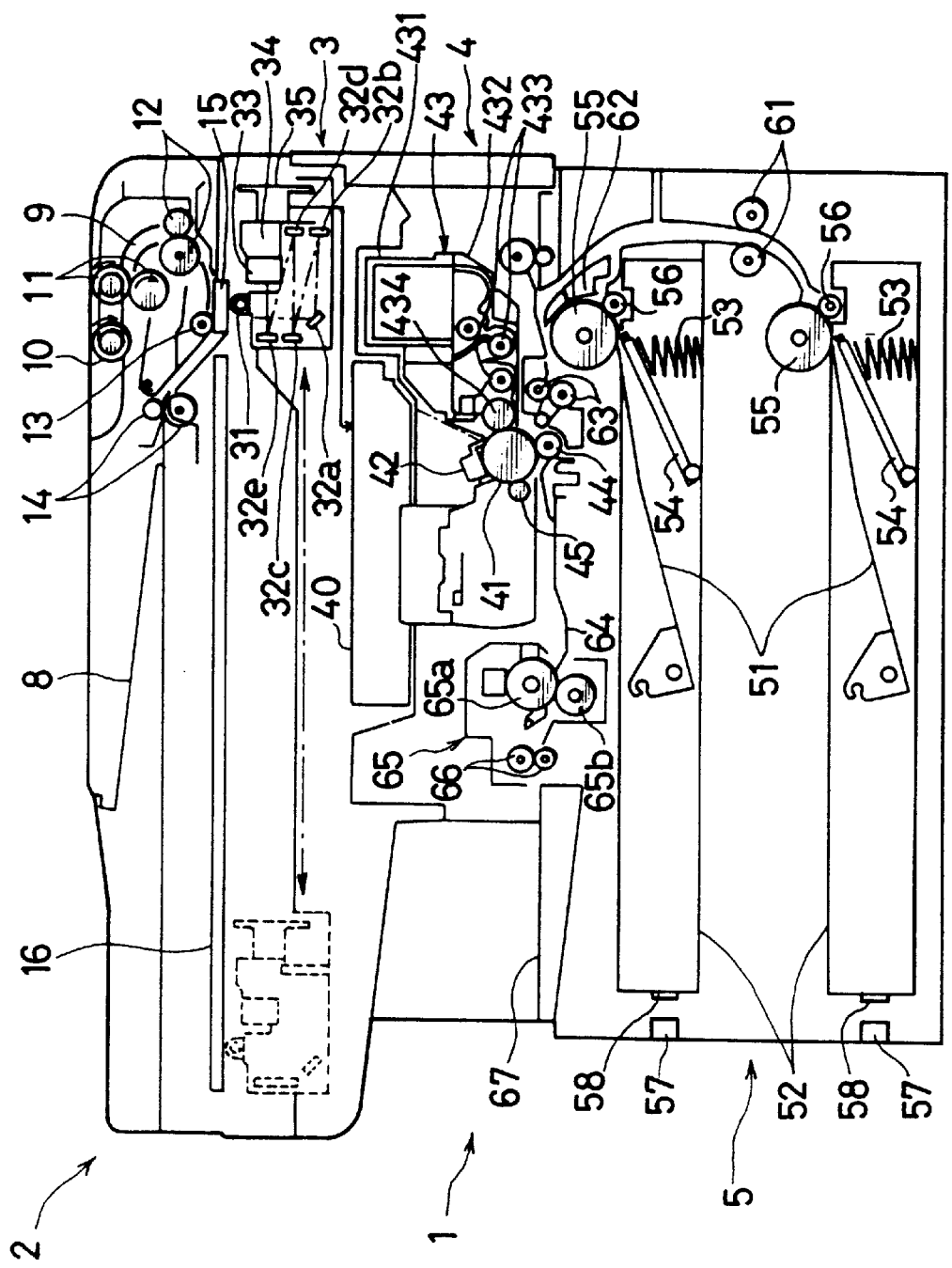
FIG. 2 is a diagram showing an internal arrangement of the facsimile machine.

Note that left and right directions in FIG. 2 is the lengthwise direction of the facsimile machine, while front and rear directions in FIG. 2 is the widthwise direction of the facsimile machine.

The facsimile machine comprises main body 1 and automatic document feeder 2 arranged at the top of the main body 1. The main body 1 comprises a scan unit 3 (optical mechanism), imaging assembly 4, sheet storage portion 5, sheet transport mechanism 6, and operating panel 7 to enable image formation.

The automatic document feeder 2 includes a document setting portion 8 and a document transport guide 9 on the right of the document setting portion in FIG. 2. Documents stacked on the document setting portion 8 are fed one after another through the document transport guide 9 which has a U-shape and returned to the document setting portion 8, while being transported along a specified document transport path.

Specifically, document feed roller 10, document separation roller pair 11, document transport guide 9, document transport roller pair 12, document guide roller 13, and document discharge roller pair 14 define the document transport path, and are disposed from upstream side with respect to the document transport direction in this order. A contact glass 15 is arranged at a specified position between the document transport roller pair 12 and document guide roller 13 for reading an image of a document fed through the automatic document feeder 2. A contact glass 16 is disposed at the top of the main body 1 having a length substantially over an entire length of the main body 1. The contact glass 16 is adapted for reading an image of a manually set document.

The feed roller 10 and one of the separation roller pair 11 (upper roller in FIG. 2) are rotated in the forward direction in synchronism with each other, and a belt is stretched over the feed roller 10 and the upper separation roller 11 to feed the document forward. The document feed roller 10 is connected to the free end of an arm member (not shown) and is brought to a pressing contact state with a lead end upper surface of the uppermost document of a plurality of documents stacked on the document setting portion 8. Documents stacked on the document setting portion 8 are fed one after another by the rotation of the document feed roller 10 over the belt in the forward direction, separated by the document separation roller pair 11, and transported by the transport roller pair 12 to a specified position on the contact glass 15 where an image of the document is read. After having the image read one after another, the documents are returned to the document setting portion 8 by the guide roller 13 and discharge roller pair 14 in the same state as having been stacked on the document setting portion before image reading.

The scan unit 3 has a light source 31 including a halogen lamp to scan a document image loaded on the contact glass 15 or 16. The light source 31 travels at a specified speed in the lengthwise direction of the machine main body, shown by the broken arrows ←- - -→ in FIG. 2 (hereinafter also referred to as sub-scanning direction). Light emitted from the light source 31 is projected onto the document image to obtain a light image of the document image. The light image is reflected by a plurality of reflecting mirrors 32a to 32e and lens 33 and guided to a charge coupled device (CCD) 34. The CCD 34 (line image sensor) comprises a number of photosensitive arrays aligned in parallel with the widthwise direction of the main body 1 (hereinafter also referred to as main scanning direction). The light image is focused on the CCD 34, thereby picking up the image.

More specifically, as shown by the broken line in FIG. 2, the light image is reflected by the reflecting mirrors 32a to 32e in this order and picked up by the CCD 34 via the lens 33 line by line at a predetermined cycle to obtain image data respectively representing one line of the document image, as the light source travels at the specified speed in the sub-scanning direction. The image data thus picked up by the CCD 34 are transmitted successively to an image processing portion 35, where a specified image processing is conducted, and stored in a memory unit 101 (see FIG. 3).

Manual document setting is also available by manually lifting up the frontal end of the automatic document feeder 2 and loading a document on the document setting portion 8. In this case, note that an unillustrated guide member and drive motor are used to drive the scan unit 3 in the sub-scanning direction at a specified speed, thereby scanning an image of the document manually loaded on the document setting portion 8.

How printing is conducted with the facsimile machine is described hereafter.

The imaging assembly 4 includes a laser emitting device 40 and photosensitive member 41 which is rotated in the clockwise direction by an unillustrated drive unit. In the proximity of the photosensitive member 41, provided are main charger 42, developing portion 43, transfer portion 44, and cleaner 45 in this order from upstream side with respect to the rotating direction of the photosensitive member 41.

After having been charged uniformly by the main charger 42, the surface of the photosensitive member 41 is exposed to modulated laser beam emitted from the laser emitting device 40 to obtain an electrostatic latent image of the document image. Toner supplied from the developing portion 43 is electrically attracted to the latent image to develop the latent image to a toner image, which in turn is transferred to a printing sheet by the transfer portion 44.

Reference numeral 431 denotes a toner cartridge, and 432 denotes a housing for loading the toner cartridge 431 thereon. Agitating rollers 433, 433, whose respective rotary shafts extend in parallel with the rotary axis of the photosensitive member 41, agitate toner supplied from the toner cartridge 431 through the housing 432 and feeds the toner to a developing roller 434.

The sheet storage portion 5 includes two cassettes 52, 52 in this embodiment. The cassettes are detachably mounted to the machine main body 1 from the widthwise direction of the facsimile machine. In this embodiment, one cassette 52 contains printing sheets of A4 size (standard format size) whose shorter side is in parallel with the width of the main body 1, while the other cassette 52 contains printing sheets of B5 size whose longer side is in parallel with the width of the main body 1.

The cassette 52 (52) is provided with a sheet placing member 51 on which a plurality of printing sheets are to be loaded. A lead end (right side in FIG. 2) of the sheet placing member 51 is biased upward through a support member 54 by a biasing force of a spring 53, thereby being brought to pressing contact with a sheet feed roller 55. A sheet separation roller 56 which is rotated in the same direction as the feed roller 55 is arranged to prevent a multiple feeding of printing sheets.

Each cassette is arranged with a magnetized member 58 (on which 3-bit data is recorded) at a specified position on a rear wall (left side in FIG. 2) thereof. A sheet sensor 57 is disposed at an appropriate position on an inner side wall of the main body 1 opposing to the magnetized member 58 when the cassette is loaded in the main body 1. The sheet sensors 57 and magnetized members 58 constitute a printing sheet detecting portion. In a loaded state of the cassette, the sheet sensor 57 reads a coded signal from the magnetized member 58 whose bit information is arranged according to the identification code identifying what size of printing sheets are loaded in the cassette, thereby detecting the size of printing sheets in the cassette.

The sheet transport mechanism 6 comprises a sheet transport roller 61, sheet transport guide 62, registration roller pair 63, sheet transport guide 64, fixing portion 65, sheet discharge roller pair 66, and sheet discharge tray 67.

A printing sheet, dispensed from the cassette and fed through the feed roller 55 and separation roller 56, is transported along a sheet transport path by the transport roller 61 or transport guide 62 toward the imaging assembly 4. The thus transported printing sheet is transported to the transfer portion 44 of the imaging assembly 4 by the registration roller pair 63 as timed with exposure/scanning timing of the scan unit 3 to transfer a toner image onto the printing sheet. The printing sheet carrying the transferred image is guided to the fixing portion 65 including a heater roller 65a and presser roller 65b along the sheet transport guide 64, and discharged onto the sheet discharge tray 67 by the sheet discharge roller pair 66.

Figure 3:
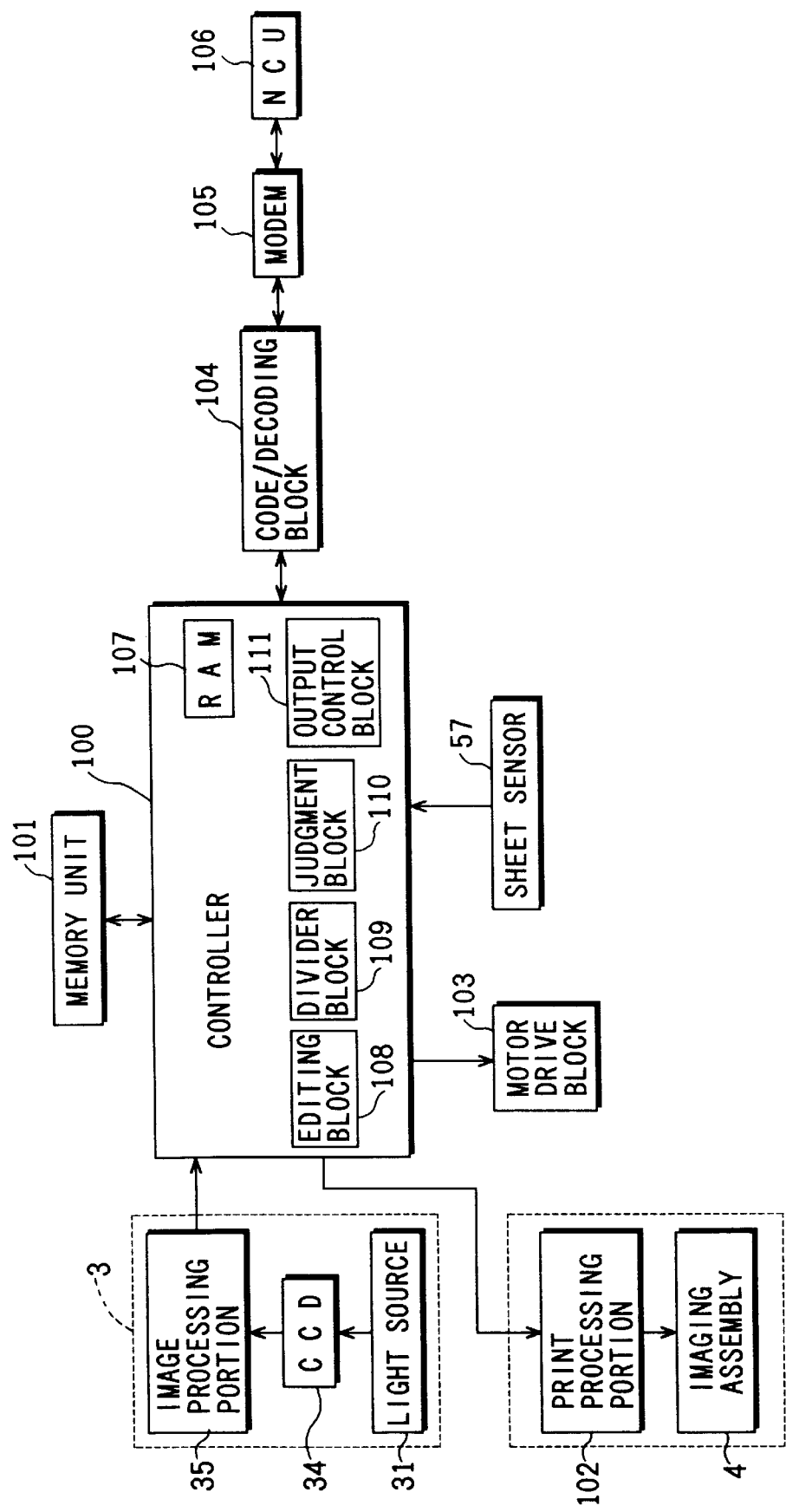
FIG. 3 is a block diagram showing a control system of the facsimile machine.

FIG. 3 is a block diagram showing an example of control system of the facsimile machine according to the present invention. Reference numeral 100 denotes a controller including a micro computer. The controller 100 controls overall operations on receiving and transmitting data from and to other facsimile machine(s).

The controller 100 is connected to the memory unit 101 (RAM) which is adapted for temporarily storing transmitted data in such a manner that data stored in the memory unit 101 can be read out and written in the controller 100 according to needs.

The controller 100 is connected to the scan unit 3 in such a manner that image data of an original document is input to the controller 100 through the light source 31, CCD34, and image processing portion 35 of the scan unit 3. The controller 100 outputs a signal to the imaging assembly 4 via a print processing block 102, and also outputs a drive signal to a motor drive block 103 which is adapted for driving the rollers in the sheet transport mechanism 6.

In receiving data from other facsimile machine(s), data is temporarily stored in the memory unit 101. Then, the controller 100 reads out the data in the memory unit 101 and outputs a process signal to the print processing block 102 where a specified image processing is conducted. Then, in the imaging assembly 4, an image is formed based on the transmitted and processed data, thereby printing the image on a printing sheet transported by the sheet transport mechanism 6. At this time, the controller 100 identifies the size of printing sheets stored in the cassette 52 based on a signal detected by the printing sheet detecting portion.

In transmitting data to other facsimile machine(s), the controller 100 operates as follows. In transmitting data of a plurality of documents, for example, the documents are placed on the automatic document feeder 2, and the scan unit 3 successively reads the image of the respective documents to obtain image data. The thus obtained image data is coded by a coding/decoding block 104, and the coded data is transmitted to a telephone line via a modem 105 and NCU 106.

The controller 100 is internally provided with RAM 107, editing block 108, dividing block 109, judgment block 110, and output control block 111. The RAM 107 stores the transmitted image data as well as information on a result of data transmission. The editing block 108 edits data in such a manner that the transmitted image data follows the information on the data transmission result (coded data), thereby obtaining resultant data for preparing a monitor report. The dividing block 109 divides the data into a plurality of block data according to one side of printing sheet in parallel with the sheet transport direction. The judgment block 110 judges whether the block data corresponding to the last page of monitor report is solely the transmitted image data. The output control block 111 inhibits a print out operation of the last page, if it is judged that the block data corresponding to the last page is only the data of transmitted image.

More specifically, the controller 100 reads out the coded data and the transmitted image data both of which are stored in the RAM 107. The editing block 108 edits data in such a manner that the transmitted image data follows the coded data, thereby obtaining resultant data for preparing a monitor report. At this stage, if the size of printing sheet detected by the sheet sensor 57 is the size other than the specified size, i.e., B5 size in this embodiment, the dividing block 109 divides the resultant data on monitor report into a plurality of block data corresponding to the side of printing sheets in the sheet transport direction (shorter side of B5-sized printing sheets in this embodiment). Then, if it is judged that the block data corresponding to the last page of monitor report is the transmitted image data alone, the controller 100 controls the output control block 111 to inhibit printing of the last page.

Judgment as to whether the data corresponding to the last page is the transmitted image data alone is conducted based on the presence or absence of boundary portion on the data corresponding to the last page or the amount of data stored in the RAM 107 corresponding to the last page. This judgment may be a judgment as to whether the data corresponding to the last page is coded data (and image data) or image data only.

Note that transmitted image data to be edited by the editing block 108 may correspond to at least a leading page (first page) of the documents whose image has been transmitted.

Figure 4:
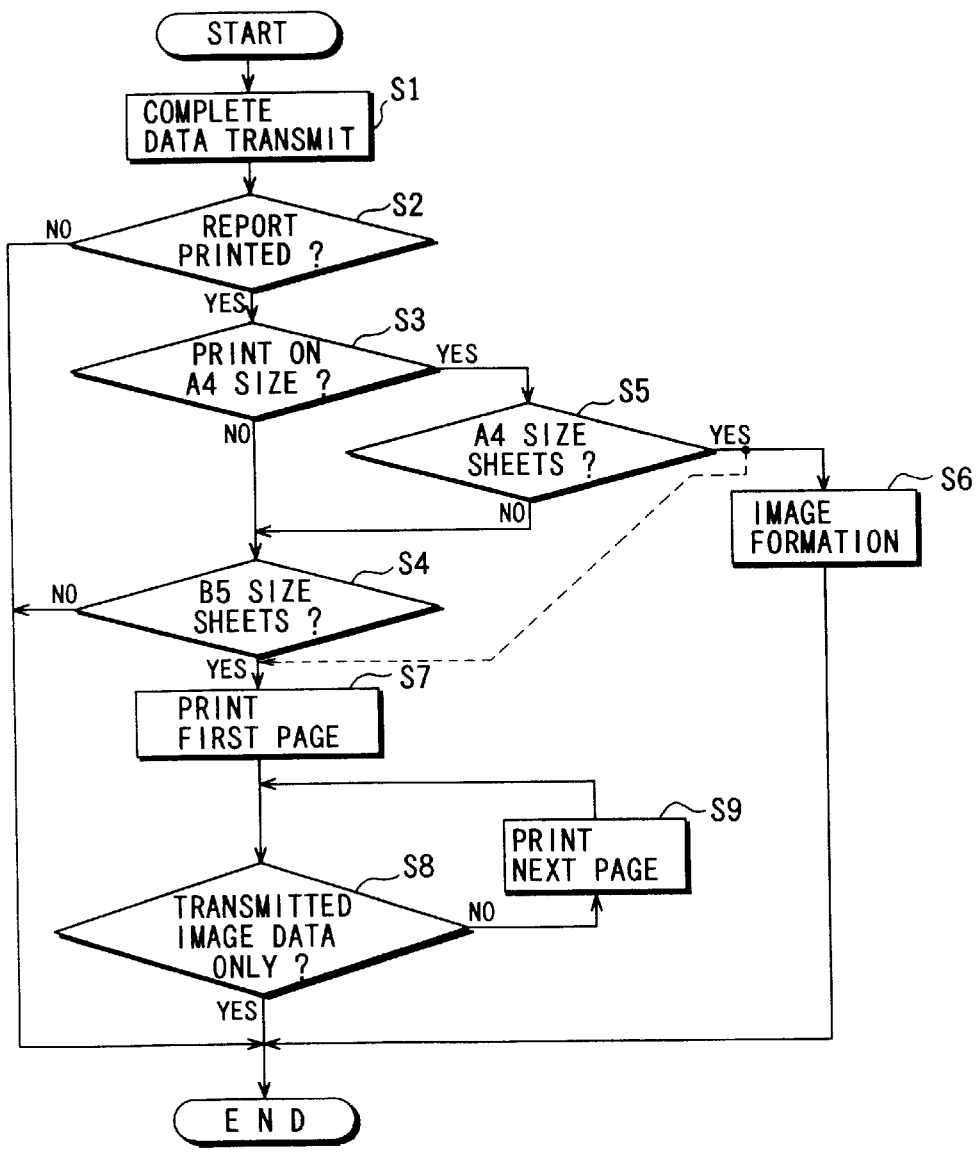
FIG. 4 is a flowchart showing control operations of the facsimile machine.

An example of control operations of the control system having the above arrangement is described with reference to a flowchart in FIG. 4.

When data transmission by the facsimile machine is completed in Step S1, it is judged whether a report on the data transmission is to be printed in Step S2. If the report is not to be printed (NO in Step S2), this routine ends. If the report is to be printed (YES in Step S2), this routine proceeds to Step S3.

In Step S3, it is judged whether the report is printed on printing sheets of predetermined size (in this embodiment, A4-size). If the report is printed on printing sheets of a size other than A4-size (NO in Step S3), this routine proceeds to Step S4. If the report is printed on printing sheets of A4-size (YES in Step S3), it is then judged in Step S5 whether printing sheets of A4-size are stored in the cassette. If the printing sheets of A4-size are stored (YES in Step S5), the control portion 100 allows the imaging assembly 4 to form image formation on A4-sized printing sheets in Step S6. If the printing sheets of A4-size are not stored (NO in Step S5), this routine proceeds to Step S4.

In Step S4, it is judged whether printing sheets of B5-size whose longer side is in parallel with the main scanning direction (i.e., widthwise direction of the facsimile machine) are stored in the cassette. If it is judged the printing sheets of B5-size in the above condition are not stored (NO in Step S4), this routine ends. If it is judged that the printing sheets of B5-size are stored (YES in Step S4), this routine proceeds to Step S7 where a first page of the report is printed on one of the B5-sized printing sheets. Then, this routine proceeds to Step S8.

In Step S8, it is judged whether a following page contains only the transmitted image data. If the following page contains data other than the transmitted image data (NO in Step S8), this routine goes to Step 59 where printing of the report on the following page is allowed and then returns to Step S8.

Figure 6:
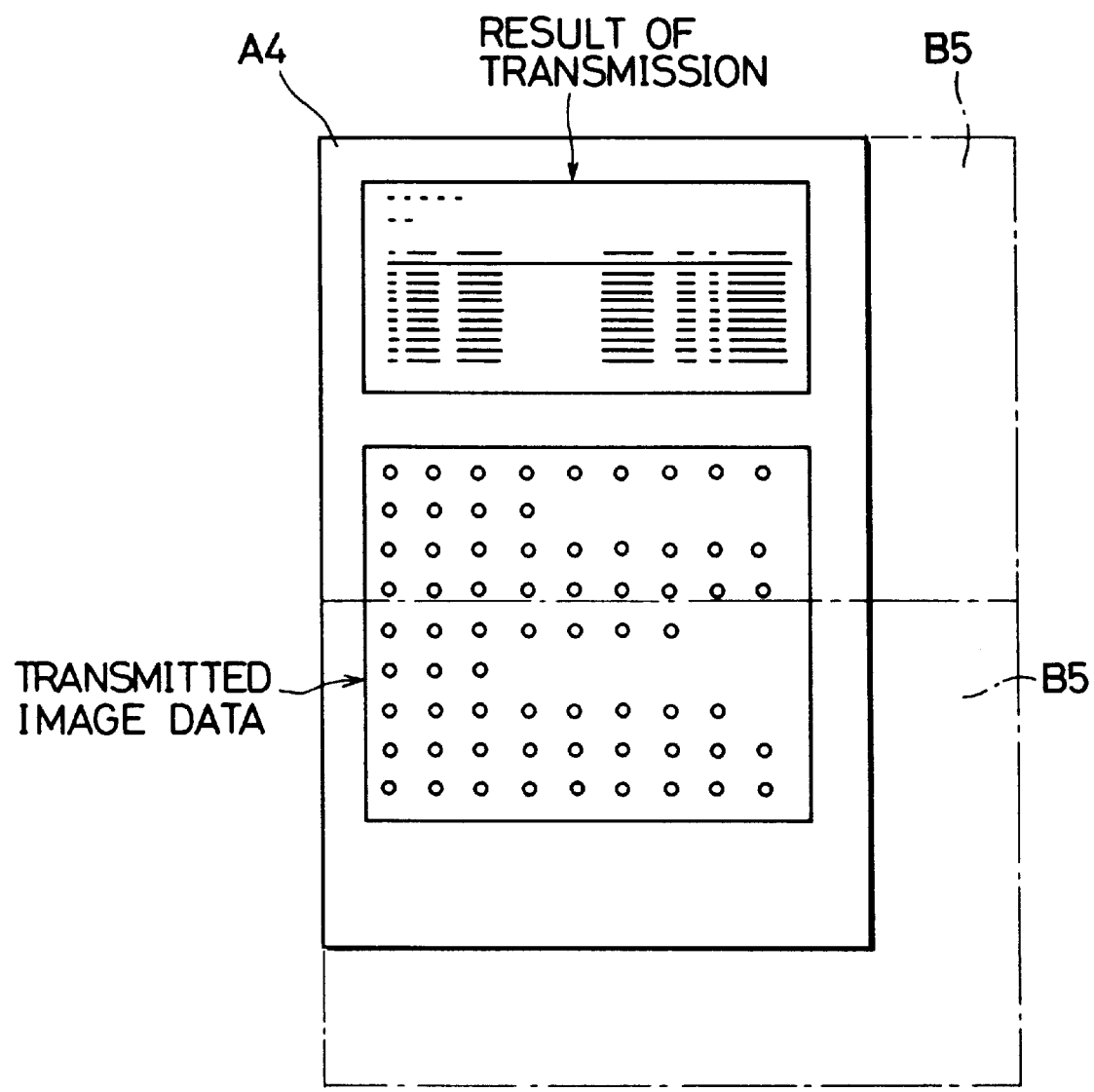
FIG. 6 is a diagram showing an example of monitor report illustrating how information on a result of data transmission and transmitted image data are to be printed on A4-sized printing sheet and B5-sized printing sheets without exercising the print control unit.

On the other hand, if it is judged that the following page does not contain data other than the transmitted image data, i.e., contains only the transmitted image data (YES in Step S8), this routine ends without printing the data on the following page. Accordingly, in the case shown in FIG. 6, the print control unit will prohibit the print out of the image data on a second B5 size printing sheet as it is apparently judged that the last page of B5 size print sheet would only contain the image data of the transmitted image data.

According to the present invention, in case that the facsimile machine runs short of printing sheets of A4-size which is the standard format size for printing a monitor report, and B5-sized printing sheets whose longer side is in parallel with the main scanning direction of the facsimile machine are available, if it is judged that the block data corresponding to the last page of report contains transmitted image data alone, the controller 100 controls the output control block 111 to inhibit printing of the last page of monitor report.

Accordingly, consumption of printing sheets can be reduced, since the facsimile machine of this invention does not controllably print the last page of monitor report under the above-mentioned conditions according to the operation of the user. Further, there can be reduced operation time of the facsimile machine after data transmission, since printing of the last page is prohibited under the above conditions.

The present invention is not limited to a facsimile machine provided with two cassettes each containing A4-sized printing sheets whose shorter side is in parallel with the main scanning direction of the facsimile machine and 35-sized printing sheets whose longer side is in parallel with the main scanning direction of the facsimile machine, but may be applicable to any other case as long as a cassette contains printing sheets whose one side in parallel with the main scanning direction covers the area of line image sensor.

Alternately if the predetermined size sheets, A4 size printing sheet, is available, then still it is possible to inhibit the print out of the image data on the last page of printing sheet if it is judged that only the transmitted image data is to be printed on the last page of the printing sheet. Thus such alternate procedure would be indicated by the dotted lines connecting a step S5 to a step S7 in FIG. 4.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A facsimile machine with a plurality of cassettes, capable of printing a transmission report including first data and second data on a printing sheet accommodated in the cassette where the first data being a result of the transmission and the second data being an image data of a transmitted data, comprising:

a memory unit for storing the first data and the second data therein to be read out;

an editing unit for reading out the first data and the second data from the memory unit and formulating a resultant data in a unit of predetermined size for the transmission report;

a sheet size set unit for detecting and setting a size of printing sheet on which the resultant data is to be printed;

a divider unit for dividing the resultant data into a plurality of block data according to the size set by the sheet size set unit;

a judgment unit for judging whether the block data corresponding to the last page of report is solely the second data; and a print control unit for inhibiting printing of the second data on the last page of report when it is judged that the block data corresponding to the last page of report is solely the second data by the judgment unit.

2. A facsimile machine according to claim 1, wherein the size set by the sheet size set unit is the same as the size of the predetermined size.

3. A facsimile machine according to claim 2, wherein the sheet size set unit includes a sensor for detecting the size of printing sheets accommodated in the cassette.

4. A facsimile machine according to claim 3, wherein the sheet size set unit sets a printing sheet accommodated in the other cassette whose size is smaller than the predetermined size when the sensor detects the absence of printing sheets of the predetermined size in the one cassette.

5. A facsimile machine according to claim 4, wherein the size of printing sheets set by the printing sheet size set unit, when the sensor detects the absence of printing sheets of the predetermined size, is set such that the longer side thereof is in parallel with the widthwise direction of main body of the facsimile machine and greater than the width of the printing sheet of the predetermined size.

6. A facsimile machine according to claim 1, wherein the printing sheet size set unit allows a selection of a printing sheet accommodated in the other cassette regardless of a detection result of printing sheets of the predetermined size in the one cassette.

7. A facsimile machine according to claim 1, further comprising a report output instruction unit for selectively instructing a print out of the transmission report and inhibiting a print out of the transmission report.

* * * * *